(12) United States Patent
Gschwind et al.

(10) Patent No.: US 7,788,201 B2
(45) Date of Patent: Aug. 31, 2010

(54) METHOD, SYSTEM, AND PROGRAM PRODUCT FOR DISPATCHING AN EVENT TO A RULE USING KEY-VALUE PAIR

(75) Inventors: Thomas Gschwind, Zurich (CH); Ana C. Biazetti, Cary, NC (US); Adam B. Darney, Cary, NC (US); Edward J. Dobner, Raleigh, NC (US); Metin Feridun, Thalwil (CH); Kimberly L. Gajda, Raleigh, NC (US); Michael Moser, Zurich (CH); Brian D. Pate, Apex, NC (US); Mack E. Phelps, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 11/536,784

(22) Filed: Sep. 29, 2006

(65) Prior Publication Data

US 2008/0154830 A1    Jun. 26, 2008

(51) Int. Cl.
*G06N 5/02*      (2006.01)
(52) U.S. Cl. ...................................................... 706/47
(58) Field of Classification Search .................... 706/47
See application file for complete search history.

(56) References Cited

U.S. PATENT DOCUMENTS

| | | | |
|---|---|---|---|
| 6,490,574 B1 * | 12/2002 | Bennett et al. | 706/47 |
| 6,895,575 B2 | 5/2005 | Dharamshi | |
| 7,408,458 B1 * | 8/2008 | Sheleheda et al. | 340/506 |
| 2002/0163427 A1 | 11/2002 | Eryurek et al. | |
| 2002/0171546 A1 | 11/2002 | Evans et al. | |
| 2003/0217333 A1 | 11/2003 | Smith et al. | |
| 2004/0024888 A1 | 2/2004 | Davis et al. | |
| 2004/0161090 A1 | 8/2004 | Digate et al. | |
| 2004/0255151 A1 * | 12/2004 | Mei et al. | 713/201 |

OTHER PUBLICATIONS

Biazetti et al ("Achieving complex event processing with Active Correlation Technology" 2005).*
Liu et al ("A fast string-matching algorithm for network processor-based intrusion detection system" 2004).*

* cited by examiner

*Primary Examiner*—Donald Sparks
*Assistant Examiner*—Lut Wong
(74) *Attorney, Agent, or Firm*—Jordan Law LLC (57) ABSTRACT

The invention provides a method, system, and program product for dispatching an event to a rule. In one embodiment, the invention includes generating a table from a rule set, wherein the table includes an indication of whether each rule in the rule set corresponds to at least one event type; receiving an event; in the case that a plurality of rules in the rule set correspond to an event type of the event, dispatching the event to the plurality of rules; determining that the event should not be processed by at least one of the plurality of rules; and terminating the dispatching of the event.

14 Claims, 6 Drawing Sheets

METHOD, SYSTEM, AND PROGRAM PRODUCT FOR DISPATCHING AN EVENT TO A RULE USING KEY-VALUE PAIR

BACKGROUND OF THE INVENTION

1. Technical Field

The invention relates generally to information technology (IT) and business systems management, and more particularly, to a method for efficiently dispatching an event to one or more rules using an event dispatcher.

2. Background Art

In today's IT and business systems management (BSM) environments, there is an increasing need for event correlation rule engines that support a high throughput of events processed as part of an event-driven architecture. In such environments, events are received by an event correlation rule engine and dispatched to the rules applicable to the event. Often, such rules are organized in a hierarchical, domain-based rule set, where blocks of rules contain other nested rule blocks. Typically, each rule block represents the rules pertaining to a given domain.

Known methods and systems typically employ a reference to the rule set within the event correlation rule engine. As such, the event is processed according to the hierarchy of the rule set. However, this requires the event correlation rule engine to traverse every rule block and rule within the rule set to determine whether the rule block or rule is applicable to a particular event. This procedure must be repeated each time an event is received. This is both inefficient and wasteful in terms of the performance of the IT or BSM system, as every rule block and rule in the rule set is inspected for each event, even though only a proportionally small number of rule blocks or rules are typically applicable to any particular event.

To this extent, a need exists for a method, system, and program product for more efficiently dispatching an event to rule(s) applicable to the event.

SUMMARY OF THE INVENTION

The invention provides a method, system, and program product for dispatching an event to a rule. In one embodiment, the invention includes generating a table from a rule set, wherein the table includes an indication of whether each rule in the rule set corresponds to at least one event type; receiving an event; in the case that a plurality of rules in the rule set correspond to an event type of the event, dispatching the event to the plurality of rules; determining that the event should not be processed by at least one of the plurality of rules; and terminating the dispatching of the event.

In a first aspect, the invention provides a method for dispatching an event to a rule, the method comprising: generating a table from a rule set, wherein the table includes an indication of whether each rule in the rule set corresponds to at least one event type; receiving an event; and in the case that at least one rule in the rule set corresponds to an event type of the event, dispatching the event to the at least one rule.

In a second aspect, the invention provides a system for dispatching an event to a rule, the system comprising: a system for generating a table from a rule set, wherein the table includes an indication of whether each rule in the rule set corresponds to at least one event type; a system for receiving an event; and a system for dispatching the event to the at least one rule.

In a third aspect, the invention provides a program product stored on a computer-readable medium, which when executed, dispatches an event to a rule, the program product comprising: program code for generating a table from a rule set, wherein the table includes an indication of whether each rule in the rule set corresponds to at least one event type; program code for receiving an event; and program code for dispatching the event to the at least one rule.

In a fourth aspect, the invention provides a method for deploying an application for dispatching an event to a rule, comprising: providing a computer infrastructure being operable to: generate a table from a rule set, wherein the table includes an indication of whether each rule in the rule set corresponds to at least one event type; receive an event; and dispatch the event to the at least one rule.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for efficiently dispatching of an event to one or more hierarchically organized rules using an event dispatcher.

Figure 1:
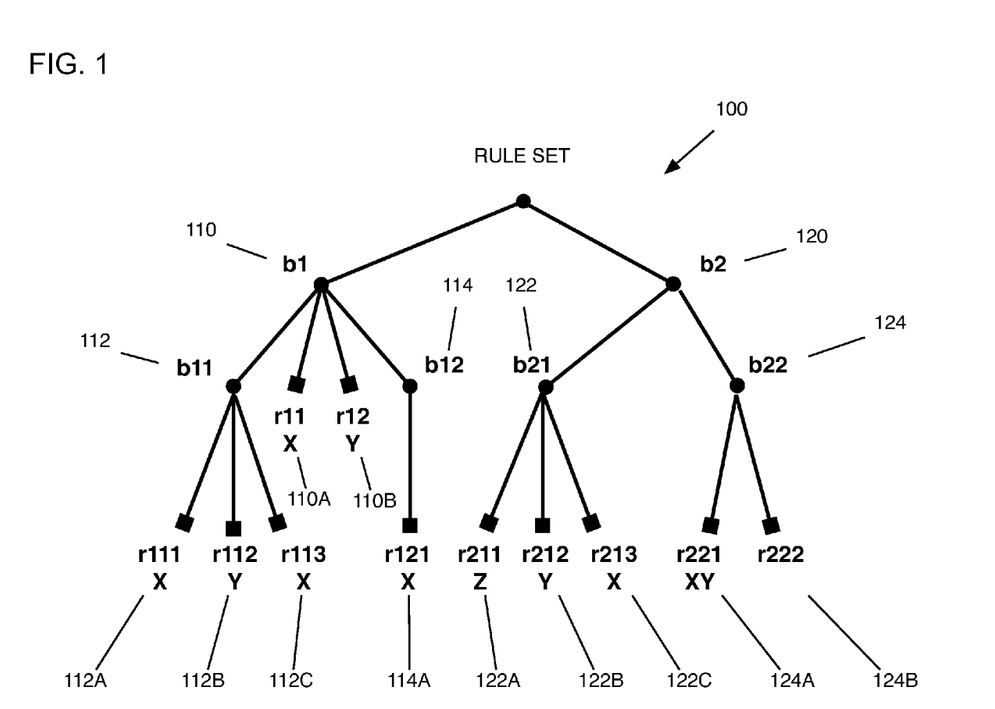
FIG. 1 shows a schematic representation of a rule set useful in practicing the present invention.

Turning now to the drawings, FIG. 1 shows a hierarchical rule set 100 typical of one used in the present invention. Rule set 100 includes rule blocks 110, 112, 114, 120, 122, 124, each of which includes one or more rules and/or one or more nested rule blocks. For example, rule block 110 (b1) includes two rules 110A (r11), 110B (r12) as well as two nested rule blocks 112 (b11), 114 (b12), each of which contains its own rules 112A (r111), 112B (r112), and 112C (r113) and 114A (r121), respectively. Thus, rule set 100 is shown having a hierarchical structure, such that rule blocks or rules higher in the rule set 100 are of broader scope and/or applicability than those lower in the rule set 100. Hierarchical structures other than the type shown in FIG. 1 are also possible, of course, and are within the scope of the present invention.

Within rule set 100, each rule is shown by its name (e.g., r11) as well as the type of event(s) to which it may be applied. For example, rule 110A (r11) is applicable to event type X while rule 110B (r12) is applicable to event type Y. It is also possible that a single rule may be applicable to more than one event type. For example, rule 124A (r221) is applicable to both event types X and Y. It may also be possible that an event type has not been specified for a particular rule. Rule 124B (r222), for example, shows no event types to which it applies. In such a case, it will typically be assumed that the rule is applicable to all event types.

As can be seen from FIG. 1, if an IT, BSM, or other management system were to traverse all of rule set 100 for each of the potentially hundreds of thousands or millions of events received each day, a great deal of computational resources would be expended simply to conclude that most rules are inapplicable to a given event. While rule set 100 is shown including eleven rules distributed among six rule blocks, most rule sets will be much more complex and include many more rules and rule blocks. Similarly, while the rules in rule set 100 are shown as being applicable to three event types (X, Y, and Z), an event management system will typically receive events spanning tens, hundreds, or even thousands of event types, the simplified example shown in FIG. 1 being provided for purposes of brevity and illustration only. In addition, while rule set 100 is shown as a hierarchical rule set, the present invention may also be applied to a non-hierarchical rule set.

Figure 2:
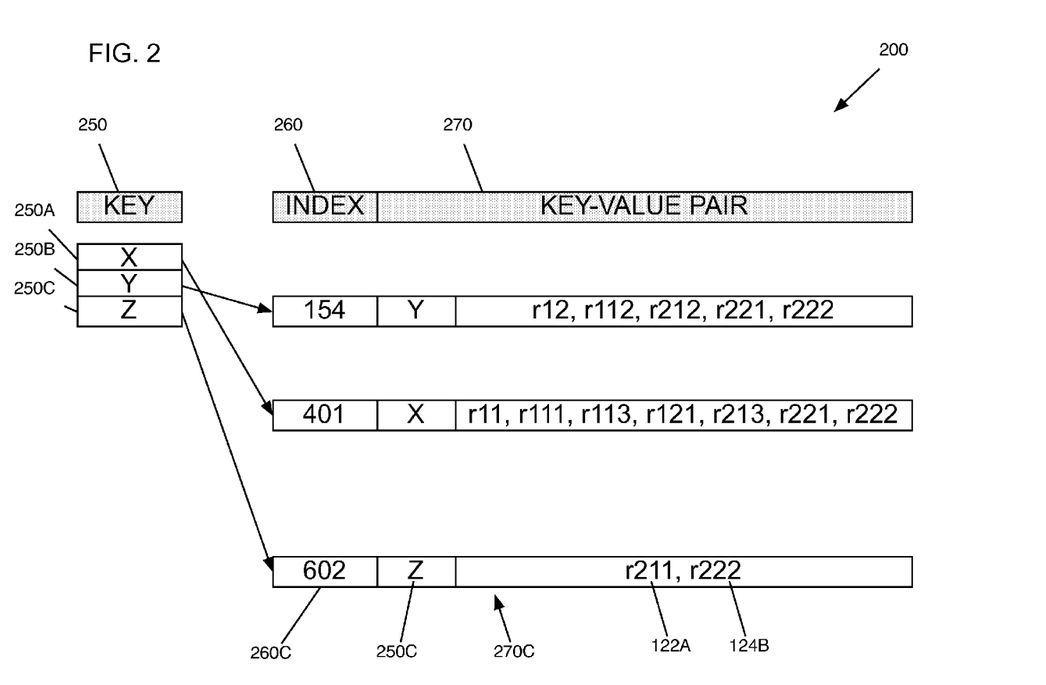
FIGS. 2-3 show illustrative hash tables of the data of FIG. 1 according to the present invention.

In order to avoid the unnecessary repeated traversing of rule set 100 described above, the present invention instead employs a table of event types and rules and/or rule blocks, such as the hash table 200 shown in FIG. 2. Hash table 200 includes a key column 250 having a number of event types 250A-C, an index column 260 into which the hashed event types will be stored, and a key-value pair column 270 showing the rule(s) applicable to each event type or combination of event types. As will be recognized by one skilled in the art, event types 250A-C may be hashed using any number of hash functions. As the methods for preparing hash tables are well known, the preparation of hash table 200 will not be described further.

Still referring to FIG. 2, it can be seen that each key-value pair associates each event type or combination of event types with one or more rules according to rule set 100 (FIG. 1). All the rules mapping to the same event type are stored within an array. For example, event type Z (250C), which has been hashed into index 602 (260C) is associated with rule r211 (122A in FIG. 1) and r222 (124B in FIG. 1). As shown by this example, a rule that applies to multiple event types is associated with every key (event type) in the hash table it applies to. In the case that an engine tasked with dispatching an event to one or more rules in rule set 100 (FIG. 1) receives an event having an event type of Z, rather than traversing all of rule set 100, the engine need only refer to hash table 200 to determine that only rules r211 and r222 are applicable to the event received. It can easily be seen, therefore, that both the computational resources and the time needed to dispatch an event are greatly reduced by the present invention, as compared to known methods and systems for dispatching an event. Hash table 200 may be prepared in any number of ways and contain various information.

In other cases, it may be desirable that the dispatching of an event to rules within a rule block is terminated if, for example, a rule within the rule block determines that the remaining rules in the rule block are inapplicable to the event. For example, referring again to FIG. 1, if an event having an event type X is received and dispatched to rule block b1 (110), the event will be dispatched first to rule r11 (110A) and then, as applicable, to rules r11 (112A), r113 (112C), r121 (114A), etc. If, however, rule r11 (110A) determines that dispatching the event to the remaining rules is either inappropriate or undesirable, such dispatching may be terminated at rule r11 (110A) or simply resumed at another rule block (e.g., b2 (120)). Such a situation may arise, for example, in the case that the event received is a login request for a network. The event type (i.e., X) may therefore be classified as a login event. If, however, it is determined at rule r11 (110A) that the user does not have login privileges for the particular network, it is unnecessary to process the event through the remaining rules, which may include, for example, determinations of the number of simultaneous logons a user is permitted, a level of access privileges (e.g., user, administrator), etc.

Figure 3:
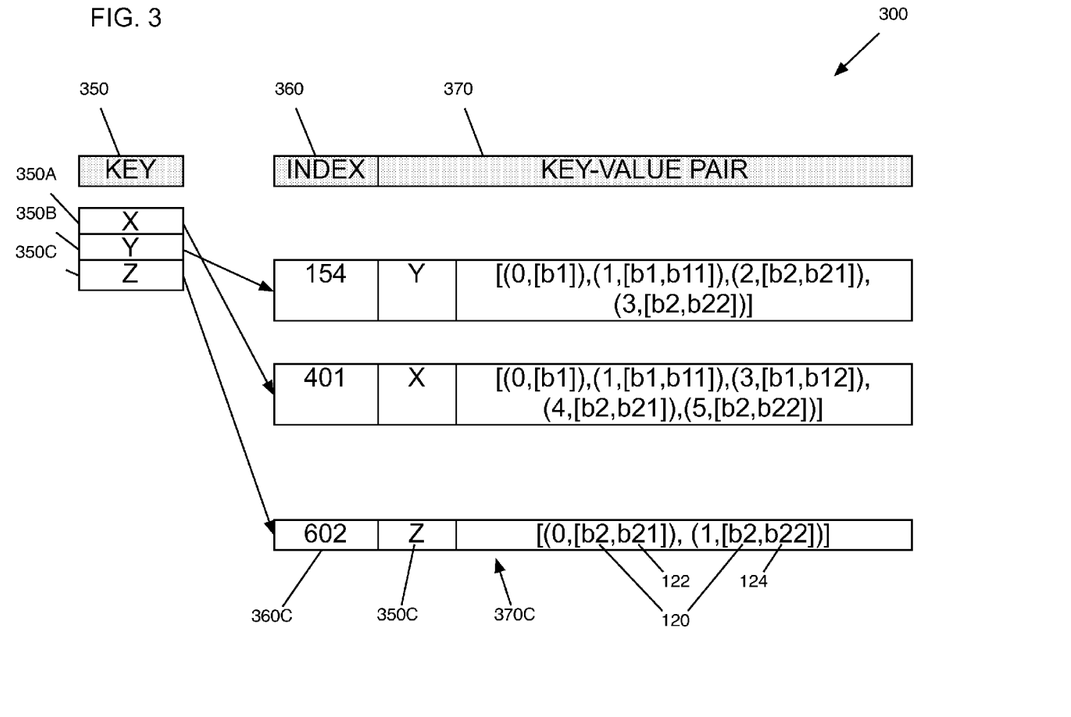

In order to implement this functionality, the hash table according to the present invention may also include applicable rule block boundaries in addition to applicable rules. Alternatively, this information can be provided as part of a separate hash table. FIG. 3 shows such a hash table 300. Event type Z (350C) has been hashed into index 602 (360C), as in hash table 200 of FIG. 2. However, instead of pairing the event type with applicable rules, as in FIG. 2, hash table 300 of FIG. 3 pairs the event type with the rule blocks containing rules applicable to the event type and an index of where in the hash table shown in FIG. 2 rules pertaining to this rule block can be found. Thus, in this second hash table (FIG. 3), event type Z is paired with rule blocks b2 (120) and b21 (122) for index 0, and b2 (120) and b22 (124) for index 1. Still referring to FIG. 3, it can be seen that each key-value pair associates each rule with the according rule blocks it is contained in according to the rule set 100 (FIG. 1). For example, event type Z (350C), which has been hashed into index 602 (360C) is associated with index 0 representing the first rule r211 (122A) in hash table 1 and rule blocks b2 (120) and b21 (122) and with index 1 representing the second rule r222 (124B) in hash table 1 and rule blocks b2 (120) and b22 (124).

A pseudo-code representation of FIGS. 2-3 is shown below, wherein the rules applicable to each event type are defined, as are the rule block boundaries.

```
typerules := Hashtable: {
    X := RuleProcessor: {
        processors:=[r11,r111,r113,r121,r213,r221,r222],
        blockBoundaries:=[(0,[b1]),(1,[b1,b11]),(3,[b1,b12]),(4,[b2,b21]),
        (5,[b2,b22])]},
    Y := Rule Processor: {
        processors:=[r12,r112,r212,r221,r222],
        blockBoundaries:=[(0,[b1]),(1,[b1,b11]),(2,[b2,b21]),(3,[b2,b22])]},
    Z := Rule Processor {
        processors:=[r211,r222]
        blockBoundaries:=[(0,[b2,b21]), (1,[b2,b22])]
}
```

Thus, in the case that an engine is tasked with skipping the remainder of the rules pertaining to event type Z (350C) in rule block b2 (120), the engine need only refer to hash table 300 and find the first index where rule block b2 (120) is no longer present. If no such index can be found, no such rule exists and the engine can stop processing the event. As another example, in the case that an engine is tasked with skipping the remainder of the rules pertaining to event type Z (350C) in rule block b21 (122), the engine again need only refer to hash table 300 and find the first index where rule block b21 (122) is no longer present. In this case, this is index 1. Hence, the engine knows that it has to continue processing from the second rule stored in the corresponding entry in hash table 200.

While shown in FIGS. 2-3 as hash tables, it should be recognized that, in practicing the invention, other types of tables may also be used to correlate event types and applicable rules and are within the scope of the present invention.

Figure 4:
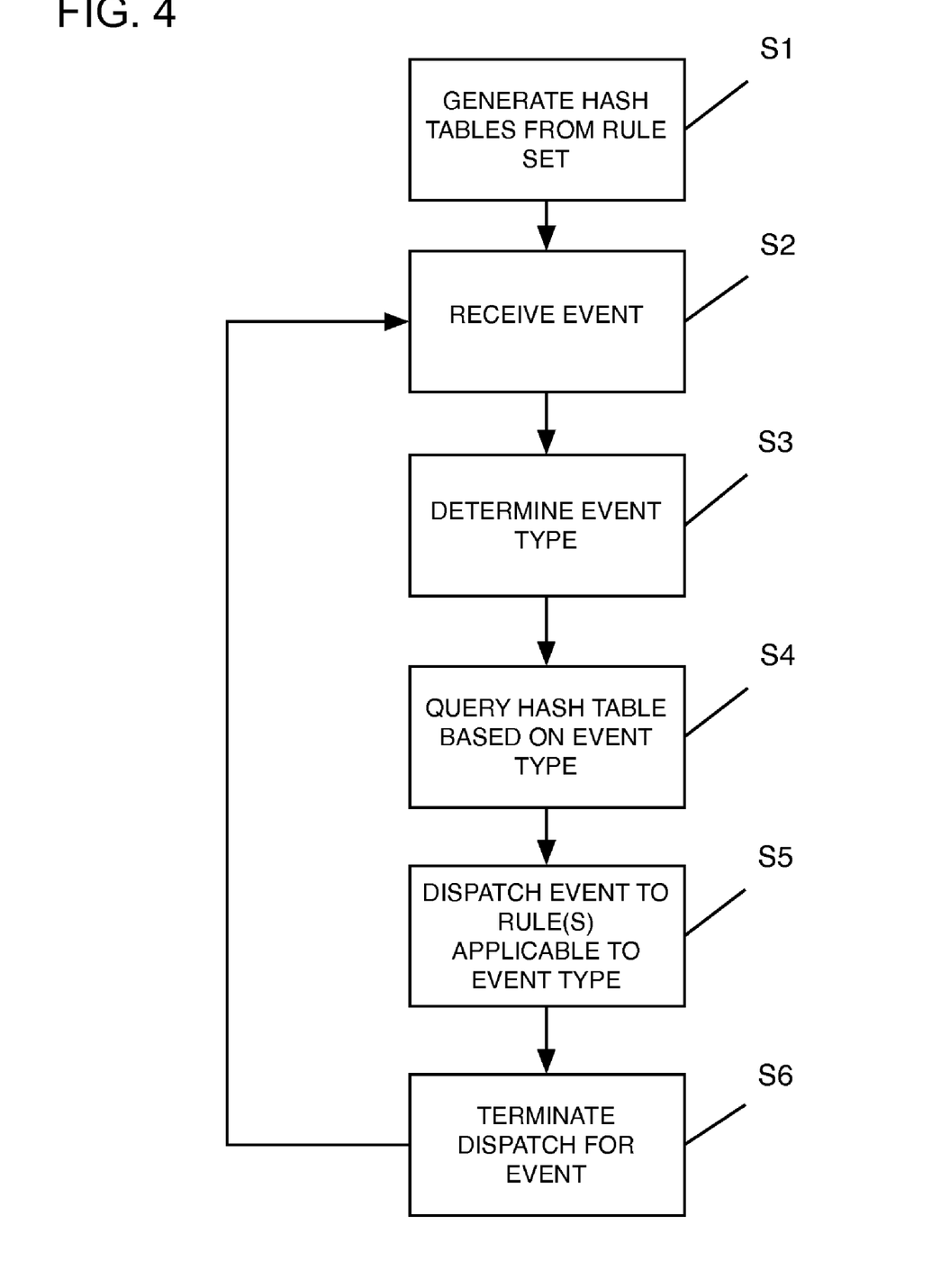
FIG. 4 shows a flow diagram of an illustrative method according to the invention.

FIG. 4 shows a flow diagram of an illustrative method according to the invention. At step S1, the hash tables are generated from a rule set. As noted above, other types of tables may also be used. Next, at step S2, an event is received and at least one event type determined at step S3. At step S4, the hash table 200 (FIG. 2) generated at step S1 is queried based on the event type(s) determined at step S3, to identify one or more rules applicable to the event. At step S5, the event is dispatched to the rule(s) applicable to its event type(s). At step S6, the dispatch is terminated.

Figure 5:
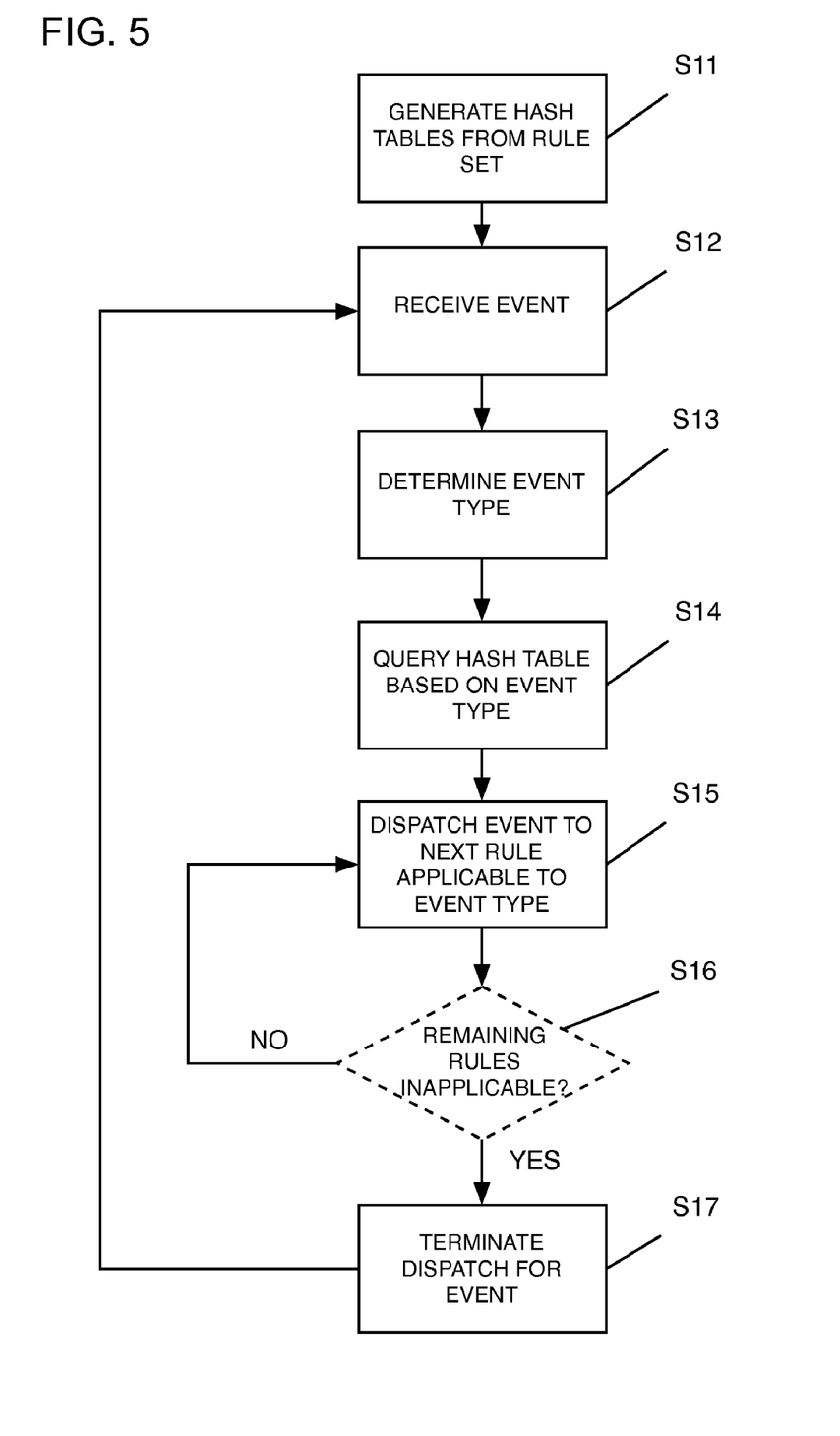
FIG. 5 shows a flow diagram of an alternative method according to the invention.

FIG. 5 shows a flow diagram of an alternative method according to the invention. Steps S11 through S14 correspond to steps S1 through S4 in FIG. 4. However, in the method of FIG. 5, step S5 of FIG. 4 has been split up into two steps S15 and S16. After the events has been processed in step S15 by a rule, it may be determined, after dispatching the event to a rule at step S15, that the event should not be dispatched to some of the remaining rules identified at step S14. For example, if the event received is a network logon request, a rule applicable to such an event may be "user must have logon privileges." If it is determined that the user does not have such logon privileges, it may be determined at optional step S16 that the event should not be processed by any remaining rules applicable to the event (i.e., "YES" at step S16). In such a case, dispatch of the event may be terminated at step S17. Alternatively, it may be determined at step S16 that only the rules of the current rule block, for example, should be skipped. In this case step S16 uses the hash table 300 generated in step S1 to identify the rule block from which the engine should continue to process rules with such processing continuing at step S15. If, on the other hand, it is determined that it is still appropriate to process the event using the remaining rules identified at step S14 (i.e., "NO" at step S16), processing continues at step S15 without skipping any rules. Steps S15 and S16 repeat until there are no more rules to be executed.

The workflows shown in FIGS. 4-5 are not the only workflows possible to implement the invention. For example, if multiple events need to be processed, processing can continue at step S2 (FIG. 4) or step S12 (FIG. 5). In addition, it is possible to delay the generation of the hash tables in step S11 (FIG. 5) until the hash tables are accessed for the first time (e.g., as part of steps S14 and S16 (FIG. 5), respectively) and to create them on demand.

Figure 6:
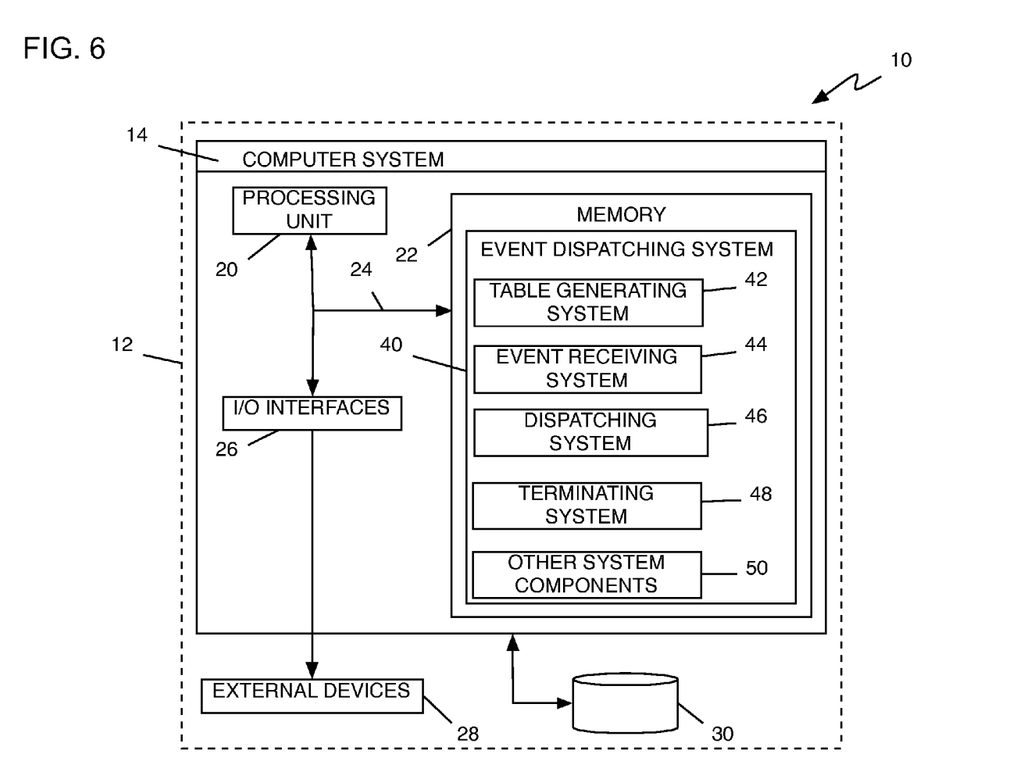
FIG. 6 shows a block diagram of an illustrative system according to the invention.

FIG. 6 shows an illustrative system 10 for dispatching an event to a rule. To this extent, system 10 includes a computer infrastructure 12 that can perform the various process steps described herein for dispatching an event to a rule. In particular, computer infrastructure 12 is shown including a computer system 14 that comprises an event dispatching system 40, which enables computer system 14 to dispatch an event to a rule by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as event dispatching system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and event dispatching system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, event dispatching system 40 enables computer system 14 to dispatch an event to a rule. To this extent, event dispatching system 40 is shown including a table generating system 42, an event receiving system 44, a dispatching system 46, and a terminating system 48. Operation of each of these systems is discussed above. Event dispatching system 40 may further include other system components 50 to provide additional or improved functionality to event dispatching system 40. It is understood that some of the various systems shown in FIG. 6 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for dispatching an event to a rule, it is understood that the invention further provides various alternative embodiments. For example, in one embodiment, the invention provides a computer-readable storage medium that includes computer program code to enable a computer infrastructure to dispatch an event to a rule. To this extent, the computer-readable storage medium includes program code, such as event dispatching system 40, that implements each of the various process steps of the invention. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.). In addition, a computer-readable signal medium can comprise a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to dispatch an event to a rule as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for dispatching an event to a rule. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for dispatching an event to a rule, the method comprising:
    employing at least one computing device for:
       generating a table from a rule set, wherein the table includes a key-value pair associating at least one event type with an array of rules applicable to the at least one event type;
       receiving an event; and
       dispatching the event to at least one applicable rule;
    wherein the rule set includes at least one rule block having at least one rule, and in the case that a rule of the rule block indicates that the event should not be dispatched to any other rule of the rule block, the method further comprises:
       dispatching the event to at least one of the following:
          a rule outside the rule block; and
          an additional rule block outside the rule block.

2. The method of claim 1, wherein, in the case that the event is dispatched to a plurality of rules in the rule set, the method further comprises:
    determining that the event should not be processed by at least one of the plurality of rules; and
    terminating the dispatching of the event.

3. The method of claim 1, wherein the table is a hash table.

4. The method of claim 3, wherein the hash table includes:
    a plurality of rules associated with an event type; and
    at least one rule block boundary for the plurality of rules.

5. The method of claim 4, further comprising:
    determining whether the received event should be dispatched to at least one rule within the rule block boundary.

6. The method of claim 5, further comprising:
    dispatching the event to a rule outside the rule block boundary, in the case that it is determined that the event should not be dispatched to at least one rule within the rule block boundary.

7. A system for dispatching an event to a rule, the system comprising:
    at least one computing device including;
       a system for generating a table from a rule set, wherein the table includes a key-value pair associating at least one event type with an array of rules applicable to the at least one event type;
       a system for receiving an event; and
       a system for dispatching the event to the at least one applicable rule;
    wherein the rule set includes at least one rule block having at least one rule, and the computing device further includes;
       a system for dispatching the event to at least one of the following:
          a rule outside the rule block; and
          an additional rule block outside the rule block.

8. The system of claim 7, further comprising:
    a system for determining whether the event should not be processed by at least one of a plurality of rules to which the event has been dispatched; and
    a system for terminating the dispatching of the event.

9. The system of claim 7, wherein the table is a hash table.

10. The system of claim 9, wherein the hash table includes:
    a plurality of rules associated with an event type; and
    at least one rule block boundary for the plurality of rules.

11. The system of claim 10, further comprising:
    a system for determining whether the received event should be dispatched to at least one rule within the rule block boundary; and
    a system for dispatching the event to a rule outside the rule block boundary.

12. A computer-readable storage medium containing a program product, which when executed, dispatches an event to a rule, the program product comprising:
    program code for generating a table from a rule set, wherein the table includes a key-value pair associating at least one event type with an array of rules applicable to the at least one event type;
    program code for receiving an event; program code for dispatching the event to the at least one applicable rule, wherein the rule set includes at least one rule block having at least one rule; and
    program code for dispatching the event to at least one of the following:
       a rule outside the rule block; and
       an additional rule block outside the rule block.

13. The program product of claim 12, further comprising:
    program code for determining whether the event should not be processed by at least one of a plurality of rules to which the event has been dispatched; and program code for terminating the dispatching of the event.

14. The program product of claim 12, wherein the table comprises a hash table including:

a plurality of rules associated with an event type; and at least one rule block boundary for the plurality of rules, and wherein the program product further comprises:

program code for determining whether the received event should be dispatched to at least one rule within the rule block boundary; and program code for dispatching the event to a rule outside the rule block boundary.

\* \* \* \* \*